(12) United States Patent
Miyake (10) Patent No.: US 6,882,864 B2
(45) Date of Patent: Apr. 19, 2005

(54) CELLULAR PHONE WITH IMAGING DEVICE

(75) Inventor: Hiroyuki Miyake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 402 days.

(21) Appl. No.: 10/061,297

(22) Filed: Feb. 4, 2002

(65) Prior Publication Data

US 2002/0142798 A1 Oct. 3, 2002

(30) Foreign Application Priority Data

Mar. 28, 2001 (JP) .................................. 2001-093816

(51) Int. Cl.$^7$ .............................................. H04B 1/38
(52) U.S. Cl. .................. 455/556.1; 455/557; 455/90.3; 455/418; 348/14.01
(58) Field of Search .............................. 455/556.1, 557, 455/550.1, 575.1, 90.3, 418, 466, 566; 348/14.01, 14.02

(56) References Cited

U.S. PATENT DOCUMENTS

| | | | | |
|---|---|---|---|---|
| 3,731,586 A | * | 5/1973 | Meazza | .................. 396/375 |
| 5,146,253 A | * | 9/1992 | Swayze | .................. 396/349 |
| 5,438,357 A | * | 8/1995 | McNelley | ............... 348/14.1 |
| 5,896,575 A | * | 4/1999 | Higginbotham et al. | .... 455/566 |
| 6,188,432 B1 | * | 2/2001 | Ejima | .................. 348/240.99 |
| 6,373,516 B1 | * | 4/2002 | Kim | .................... 348/14.01 |

FOREIGN PATENT DOCUMENTS

| | | | |
|---|---|---|---|
| DE | 39 04 464 | 8/1990 | |
| EP | 0 930 770 | 7/1999 | |
| EP | 930770 A2 | * 7/1999 | ............ H04N/1/00 |
| EP | 1 111 919 | 6/2001 | |
| GB | 2 328 343 | 2/1999 | |
| JP | 57-173823 | 10/1982 | |
| JP | 62-96626 | 6/1987 | |
| JP | 1-119274 | 8/1989 | |
| JP | 5-52828 | 7/1993 | |
| JP | 6-268582 | 9/1994 | |
| JP | 10-4540 | 1/1998 | |
| JP | 10-336498 | 12/1998 | |
| JP | 11-69214 | 3/1999 | |
| JP | 11-205761 | 7/1999 | |
| JP | 2001-320454 | 11/2001 | |
| JP | 2002-141990 | 5/2002 | |

OTHER PUBLICATIONS

U.S. Appl. No. 09/880,016, filed Jun. 14, 2001, pending.
U.S. Appl. No. 10/061,297, filed Feb. 4, 2002, pending.
Patent Abstracts of Japan, 11–146034, May 28, 1999.

* cited by examiner

*Primary Examiner*—Lee Nguyen
*Assistant Examiner*—Minh D. Dao
(74) *Attorney, Agent, or Firm*—Oblon, Spivak, McClelland, Maier & Neustadt, P.C.

(57) ABSTRACT

Hitherto, in the cellular phone equipped with an imaging device in which the cellular phone and the imaging device are integrally accommodated, for the purpose of taking a picture while visually recognizing a photographing screen on a monitor, a camera of the imaging device faces in opposite direction of the monitor. Therefore, to take a picture of a user while watching on the screen a person to whom the user is speaking, it is necessary to change the direction of the imaging device every time. In a cellular phone equipped with an imaging device 1 according to the invention, on the front side 1a provided with a monitor 4 of a housing 100 of the cellular phone, a lens 2 of the imaging device is disposed facing outwardly. Further, a viewfinder 3a is provided facing in the same direction as that of the lens 2.

3 Claims, 12 Drawing Sheets

(PRIOR ART)

Fig. 10(a)

(PRIOR ART)

(PRIOR ART)

Fig. 13

CELLULAR PHONE WITH IMAGING DEVICE

BACKGROUND OF THE INVENTION

1. Field of the Invention

The present invention relates to a cellular phone that is equipped with an imaging device mounted on the cellular phone.

2. Description of Related Art

Hitherto, several inventions in which an electronic still camera and a cellular phone (including the so-called PHS) are accommodated in one housing have been proposed to provide a composite device capable of being used as both telephone and camera.

For example, FIGS. 10 to 13 show an imaging device-mounted cellular phone (hereinafter referred to as cellular phone with imaging device) disclosed in the Japanese Patent Publication (unexamined) No. 336498/1998.

Figure 10A:
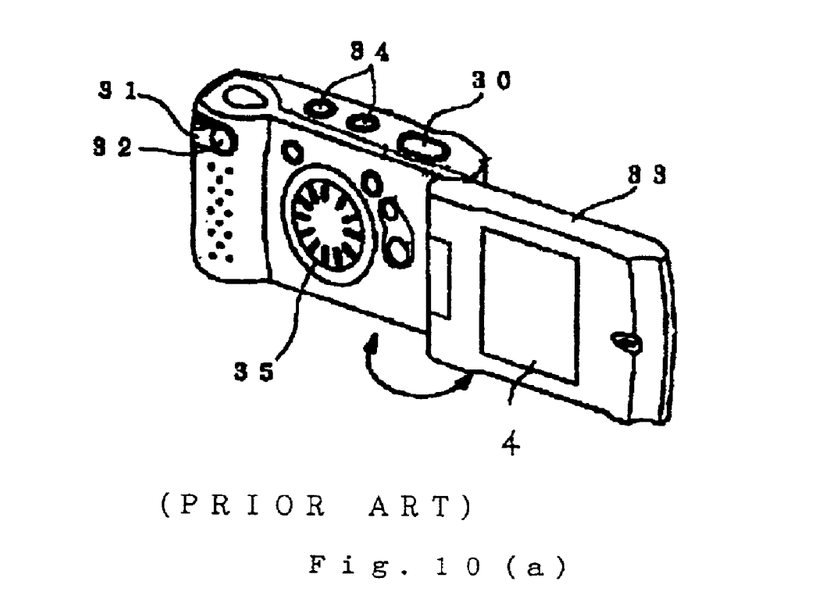
FIGS. 10(a) and (b) are explanatory external perspective views of the conventional cellular phone equipped with the imaging device.
Figure 10B:
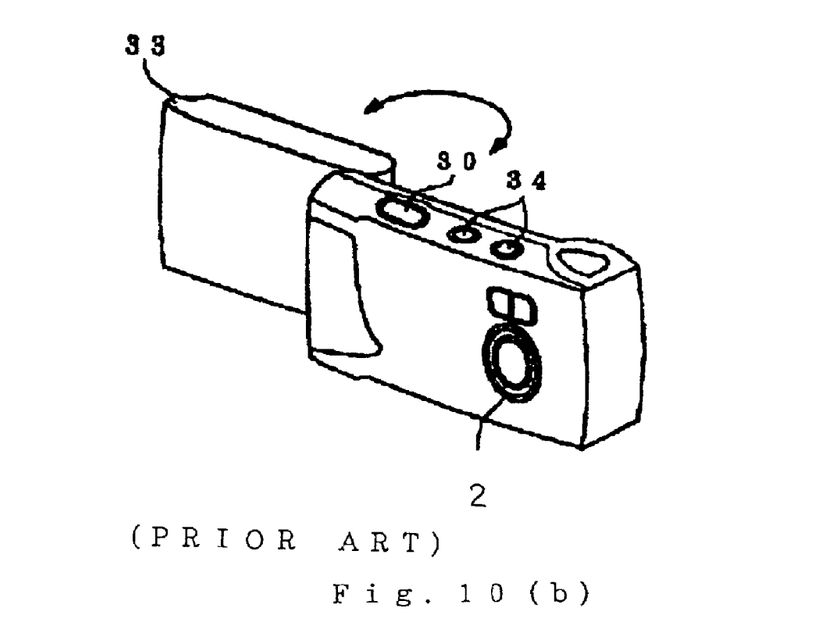

FIGS. 10(*a*) and (*b*) are schematic perspective views of the cellular phone with imaging device, and in which (*a*) shows a rear view, and (*b*) shows a front view thereof.

In the drawings, reference numeral 2 designates a lens of a camera, numeral 4 designates a liquid crystal display (hereinafter referred to as LCD), numeral 30 designates a shutter key for commanding taking a photograph, numeral 32 designates a viewfinder, and numeral 33 designates a cover. Numeral 31 designates a switch for switching between lengthwise and crosswise directions of a display screen with respect to the LCD 4 and the viewfinder 32. Numeral 34 designates an operation key that is operated at the time of displaying a telephone directory (database) used for dialing in the case of using a main body as a PHS terminal, and at the time of selecting any person one speaks to from the telephone directory. Numeral 35 designates a cross key capable of being ON/OFF in four directions, and is used at the time of moving a cursor or pointer on the LCD 4.

Figure 11:
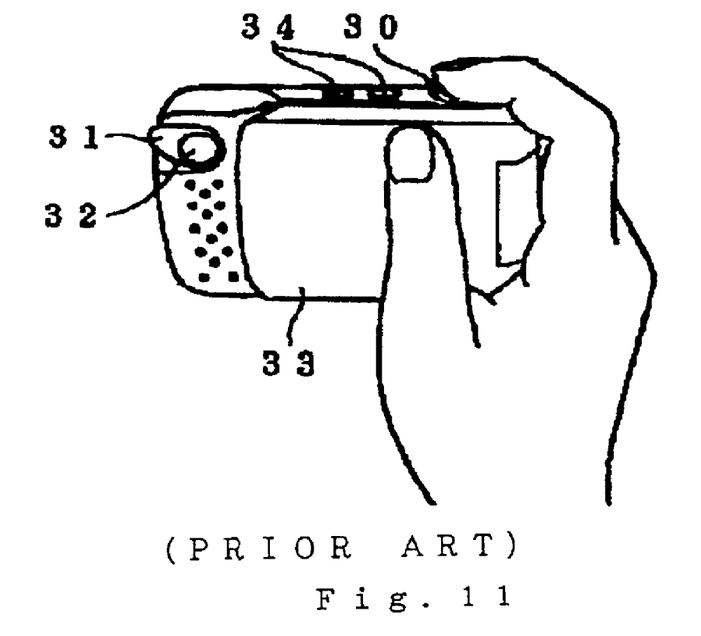
FIG. 11 is an explanatory view to explain how to use the cellular phone equipped with the imaging device of FIG. 10.

FIG. 11 shows the case of using the cellular phone equipped with the imaging device in FIG. 10 as a still camera of a viewfinder type. In the use, in the same manner as holding any ordinary camera, a user recognizes a object through the viewfinder 32 and operates the shutter key 30 by means of an index finger of a right hand grasping the main body.

Figure 12:
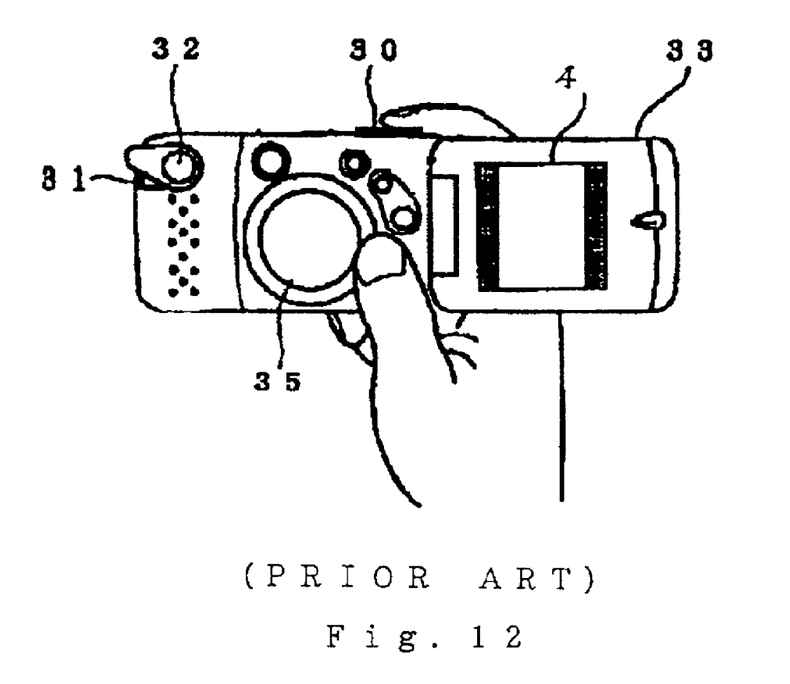
FIG. 12 is an explanatory view to explain how to use the cellular phone equipped with the imaging device of FIG. 10.

FIG. 12 shows a state of using the cellular phone equipped with the imaging device as an electronic still camera of LCD display type. The cover 33 provided with the LCD 4 is opened, the LCD 4 is fixed to a position to be seen from the user side, and a portion in the proximity of a connection between the main body and the cover 33 is grasped by the right hand. In this case, an image fetched in by means of a CCD (not shown) is displayed on the LCD 4 in a real-time manner. Accordingly, the user can recognize the object (manner of being taken) by means of the LCD 4, and operates the shutter key 30 by the index finger of the right hand grasping the main body.

Figure 13:
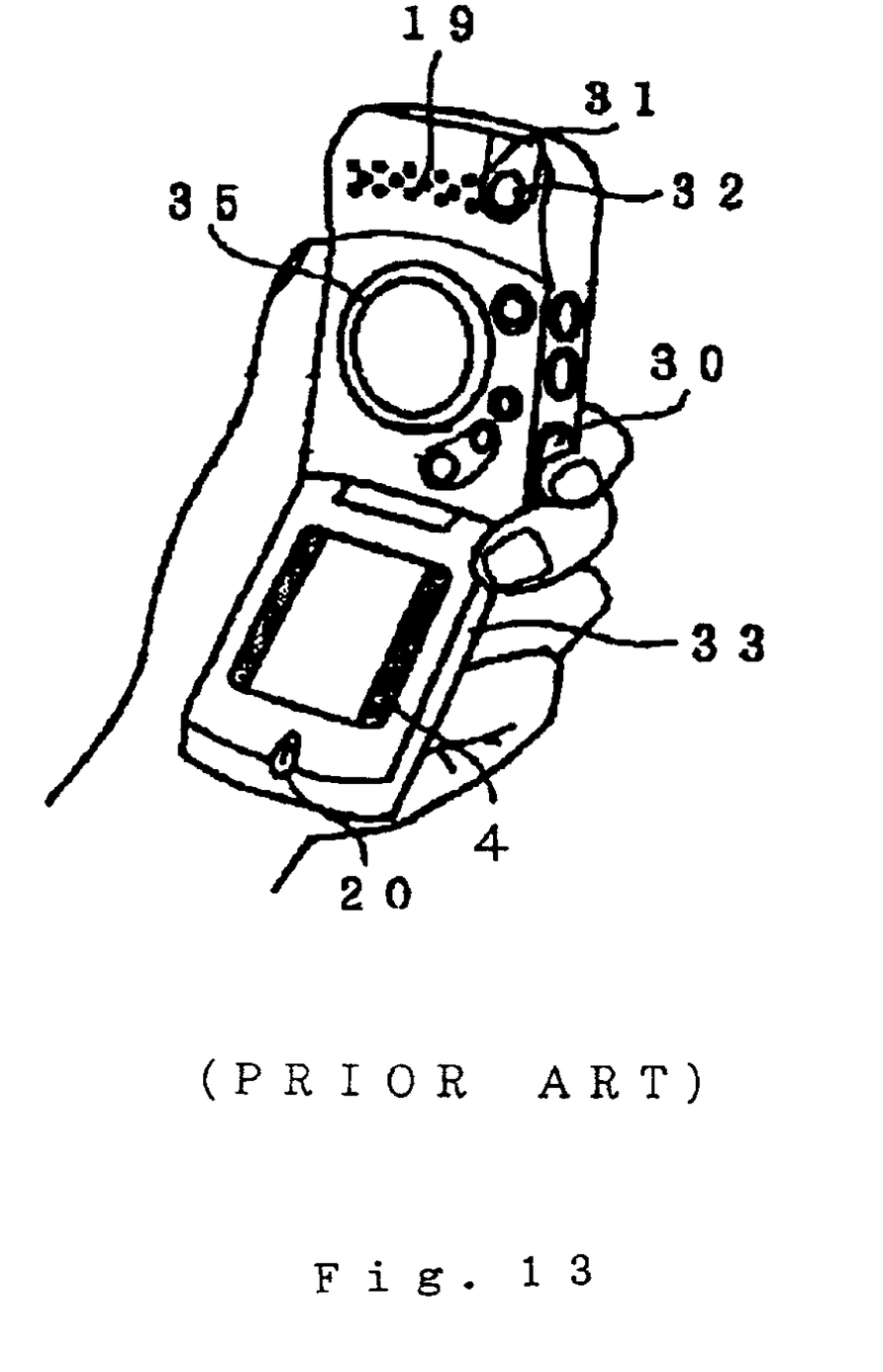
FIG. 13 is an explanatory view to explain how to use the cellular phone equipped with the imaging device of FIG. 10.

FIG. 13 shows a state of using the cellular phone equipped with the imaging device as the PHS terminal device for using a camera. In the drawing, numeral 19 designates a speaker, and numeral 20 designates a microphone.

When opening the cover 33 provided with the LCD 4 and bringing the LCD 4 in a state that the LCD 4 can be seen from the user side, a dial key, a telephone number, a telephone directory and the like are displayed on the LCD 4.

Then the user operates the operation key by a left hand grasping the main body. Further, the lens 2, which is located on the back, is caused to face in a direction intended to be photographed, and the main body is grasped by the left hand so that the shorter side comes to the top. In this case, the image fetched in is displayed on the LCD 4 in the real-time manner so that the user operates the shutter key 30 by the left hand grasping the main body while recognizing the object (manner of being taken) on the LCD 4.

Since the conventional cellular phone equipped with the imaging device is constituted as described above, in the case of using the camera, the photography can be carried out while recognizing the display screen by means of the LCD or recognizing a visual field by means of the viewfinder. However, it is strongly required that the cellular phone equipped with the imaging device performs a function of photographing a face of the user with the camera and then transmitting the face to the person at the other end of the line while recognizing the face of the person on the display screen like in the so-called video phone. Hence, a problem exists in that the conventional cellular phone with imaging camera described above cannot be used in such a manner.

SUMMARY OF THE INVENTION

The present invention was made too solve the above-discussed problem, and has an object of providing a cellular phone equipped with an imaging device which can be used in such manner that a face of a user is photographed by a camera and transmitted to the person at the other end of the line while recognizing the face of the person on a display screen.

A cellular phone equipped with an imaging device according to the invention comprises:

a housing which accommodates a transceiver capable of transmitting and receiving an audio signal, and includes a first face and a second face facing in a substantially opposite direction to the mentioned first face;

an imaging device which includes a lens disposed facing outwardly on the mentioned first face and an image device for converting a light from the mentioned lens into an image signal;

a monitor which is disposed on the mentioned first face and displays the mentioned image signal; and a viewfinder which includes a light passage aperture leading from the mentioned second face side to the mentioned first face side.

In the mentioned cellular phone equipped with the imaging device according to the invention, it is preferable that the mentioned viewfinder is provided on a viewfinder mounting member which is accommodated in a recess provided in the mentioned housing, pulled out from the mentioned recess when it is used, and fastened to the outside of the mentioned housing.

As a result of such construction, an advantage is obtained such that the viewfinder can be large-sized as compared with a size of the housing of the cellular phone, and further that the overall exterior dimensions do not need to be large.

In the mentioned cellular phone equipped with the imaging device according to the invention, it is preferable that the mentioned recess is formed on the first face or the second face of the mentioned housing;

the cellular phone equipped with the imaging device further comprising:

a speaker which is mounted on an internal part of the mentioned housing, and outputs the mentioned audio signal; and an opening which is formed within the mentioned recess, outputs a sound of the mentioned speaker, and covered with the mentioned viewfinder mounting member accommodated in the mentioned recess.

As a result of such construction, there is no more such problem that it is difficult to catch the sound in both cases of facing the camera outwardly from the user and of facing the camera toward the user.

In the mentioned cellular phone equipped with the imaging device according to the invention, it is preferable that a tiltmeter showing a degree of a tilt of the mentioned housing is provided on the surface of the mentioned housing.

In the mentioned cellular phone equipped with the imaging device according to the invention, it is preferable that the mentioned tiltmeter is provided with an indicator light that is illuminated when a signal has come into the mentioned transceiver.

In the mentioned cellular phone equipped with the imaging device according to the invention, it is preferable that the mentioned transceiver has a function of transmitting and receiving the mentioned image signal.

Another cellular phone equipped with an imaging device according to the invention comprises:

a housing which accommodates a transceiver capable of transmitting and receiving an audio signal, and includes a first face and a second face facing in a substantially opposite direction to the mentioned first face;

an imaging device which includes a lens disposed facing outwardly on the mentioned first face and an image device for converting a light from the mentioned lens into an image signal;

a monitor which is disposed on the mentioned first face and displays the mentioned image signal; and a rear side monitor which is disposed on the mentioned second face and capable of displaying the mentioned image signal.

As a result of such construction, an advantage is obtained such that the user can take a picture while recognizing a manner of the image being taken even when the imaging device is facing in either direction.

In the mentioned cellular phone equipped with the imaging device according to the invention, it is preferable that a switch capable of selecting on which one of the mentioned monitor and said rear side monitor the mentioned image signal is displayed, is provided.

As a result of such construction, battery consumption can be reduced.

In the mentioned cellular phone equipped with the imaging device according to the invention, it is preferable that a tiltmeter showing a degree of a tilt of the mentioned housing is provided on a surface of the mentioned housing.

As a result of such construction, an advantage is obtained such that the housing can be easily stood upright with respect to the ground when taking a picture.

In the mentioned cellular phone equipped with the imaging device according to the invention, it is preferable that the mentioned tiltmeter is provided with an indicator light that is illuminated when a signal has come into the mentioned transceiver.

As a result of such construction, it can be easily confirmed that any signal has come into the transceiver.

In the mentioned cellular phone equipped with the imaging device according to the invention, it is preferable that the mentioned transceiver has a function of transmitting and receiving the mentioned image signal.

As a result of such construction, any image that has been taken can be transmitted to the other person talking to.

In the mentioned cellular phone equipped with the imaging device according to the invention, since the lens and the image monitor are disposed on the same face, the user can see the image of the other person while taking a picture of the user himself. Furthermore, when taking a picture of any object long way off, the photography can be carried out while recognizing the visual field through the viewfinder.

BRIEF DESCRIPTION OF THE DRAWINGS

FIGS. 5(a) and (b) are externally perspective views of the cellular phone equipped with the imaging device according to Embodiment 2.

FIGS. 9(a) and (b) are detailed partial views of FIG. 8.

DESCRIPTION OF THE PREFERRED EMBODIMENTS

Embodiment 1

Figure 1:
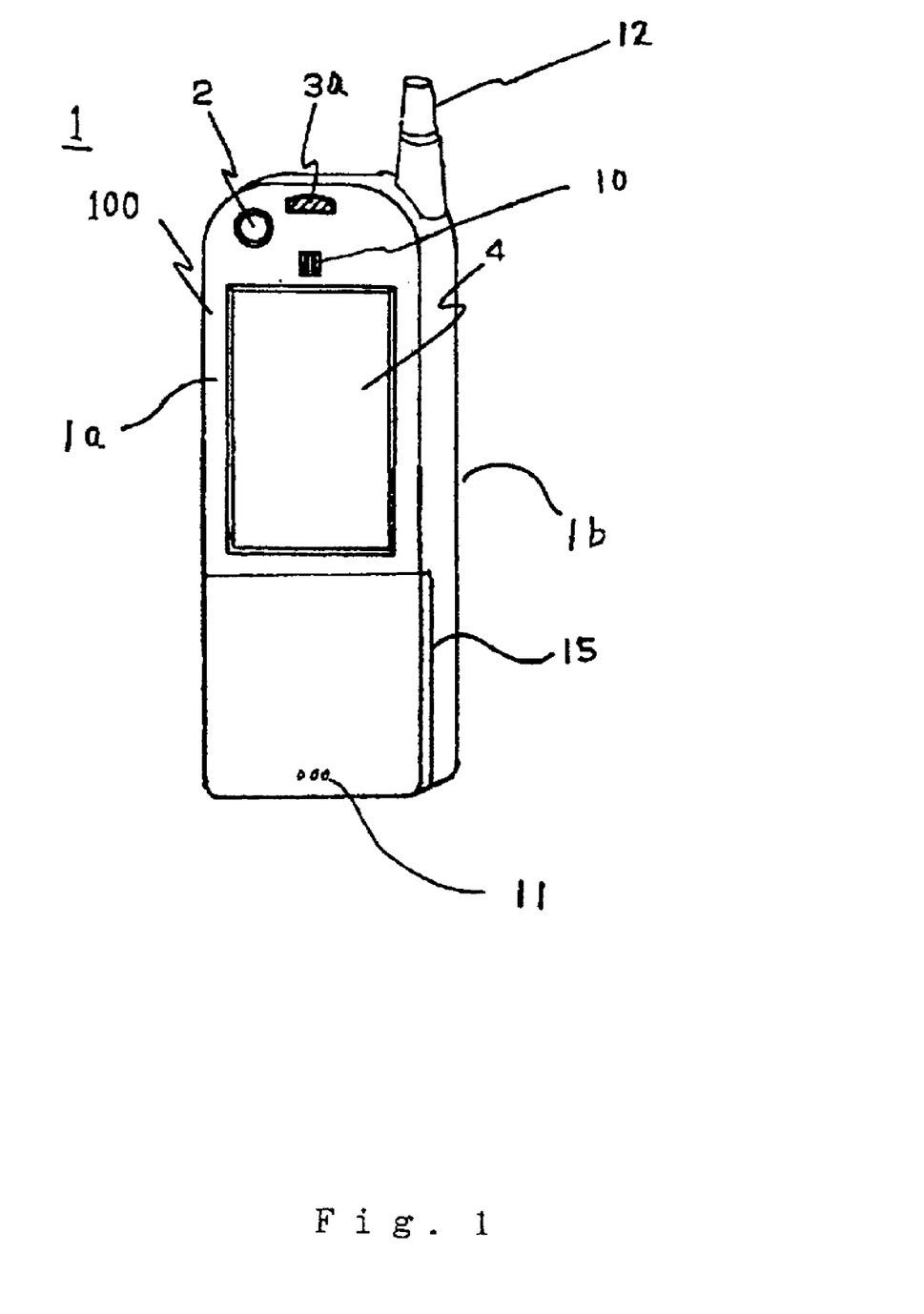
FIG. 1 is a perspective view of a cellular phone equipped with an imaging device according to Embodiment 1 of the present invention.

FIG. 1 shows an externally perspective view of a cellular phone equipped with an imaging device according to Embodiment 1 of the present invention. In the drawing, reference numeral 1 designates the cellular phone equipped with the imaging device (the cellular phone called herein includes the so-called PHS and a handy radio device (transceiver), and hereinafter collectively referred to as the cellular phone). Numeral 100 designates a housing that accommodates a transceiver at least capable of transmitting and receiving au audio signal in an internal part thereof. Numeral 1a designates a front side (called first face in this invention) of the cellular phone 1 in order to avoid confusion in the description given below. Numeral 1b designates a rear side (called second face in this invention). Although the housing 100 includes the other sides as a matter of course, it is not necessary to describe them herein and therefore no numeral is designated to them.

Numeral 2 designates a camera (called imaging device in the invention) fixedly mounted onto the housing 1 of the cellular phone, and contains on the front side 1a a lens fixed facing outwardly and an image device (not shown) converting light of this lens into an image signal. Numeral 3a designates a window facing to the object side of a viewfinder having substantially the same visual field as that of the camera 2, which window faces toward the front side 1*a* side. Numeral 4 designates a monitor provided on the front side 1*a* of the cellular phone 1 and constructed of, for example, a liquid crystal display. This monitor 4 can display an image signal photographed by the camera 2, and can display a telephone directory and mail.

Numeral 10 designates a speaker disposed on the front side 1*a* of the housing 100 of the cellular phone 1, which speaker outputs sound of the telephone and a confirmation sound along with the operation of the cellular phone 1. Numeral 11 designates a microphone disposed on the front side 1*a* of the cellular phone 1, which microphone picks up talking sound of the cellular phone. Numeral 12 designates an antenna for transmitting and receiving a talking radio wave of the cellular phone, which antenna can be extended and collapsed.

Numeral 15 designates a cover. Although not shown in the drawing, under the cover 15, a press button switch is disposed in the internal part (or on the rear side of the cover 15) for the purpose of, for example, inputting a call number or carrying out various operations.

Figure 2:
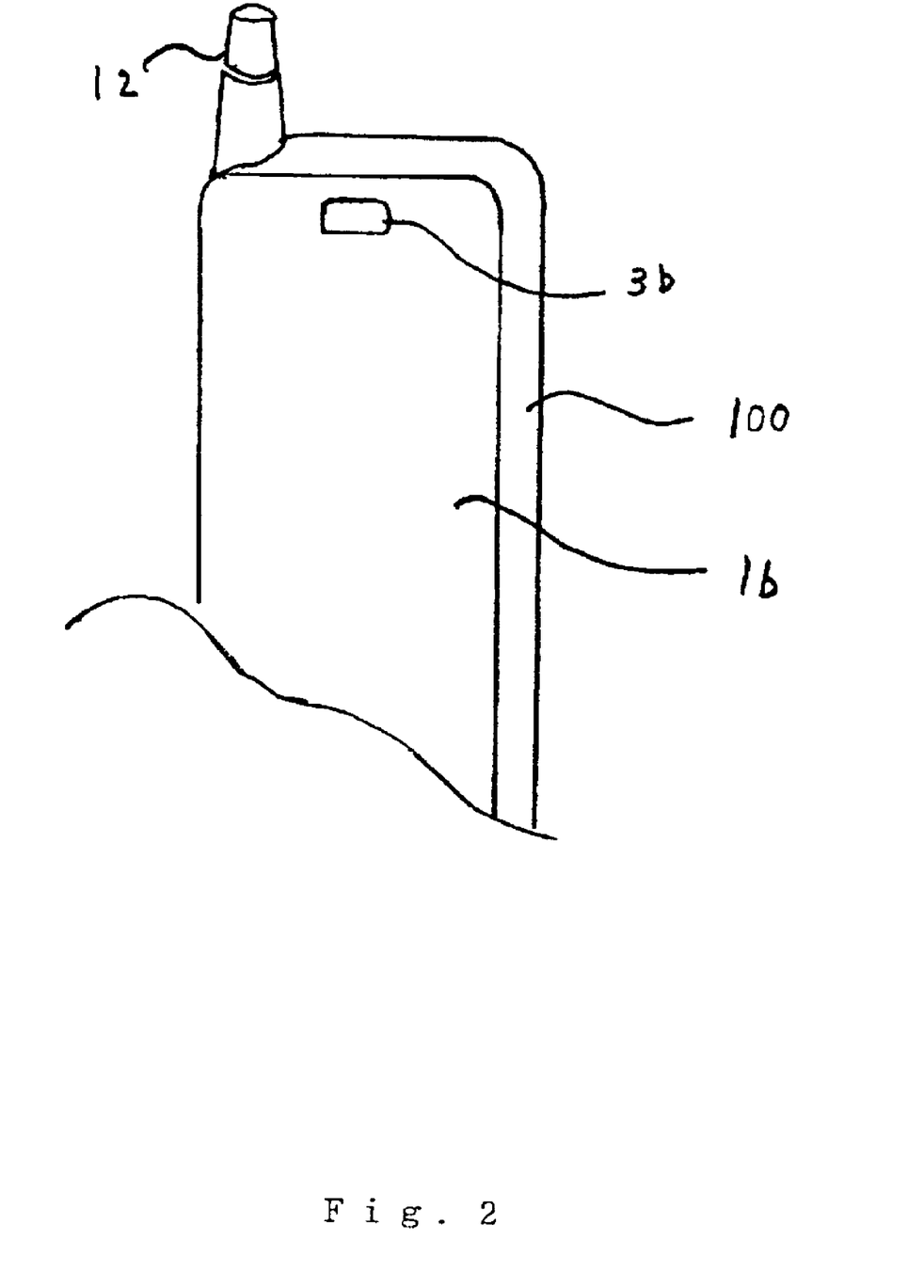
FIG. 2 is a partially rear side view of FIG. 1.

FIG. 2 is a partial view to explain the rear side 1*b* of the cellular phone 1 shown in FIG. 1. Numeral 3*b* designates a window (hereinafter referred to as an eyepiece) facing to the user side. This window 3*b* is formed on the rear side 1*b* of the viewfinder having the same visual field as that of the camera 2. From the eyepiece 3*b*, a light passage aperture not shown leads to the mentioned window on the object side of the viewfinder located on the front side 1*b*.

Figure 3:
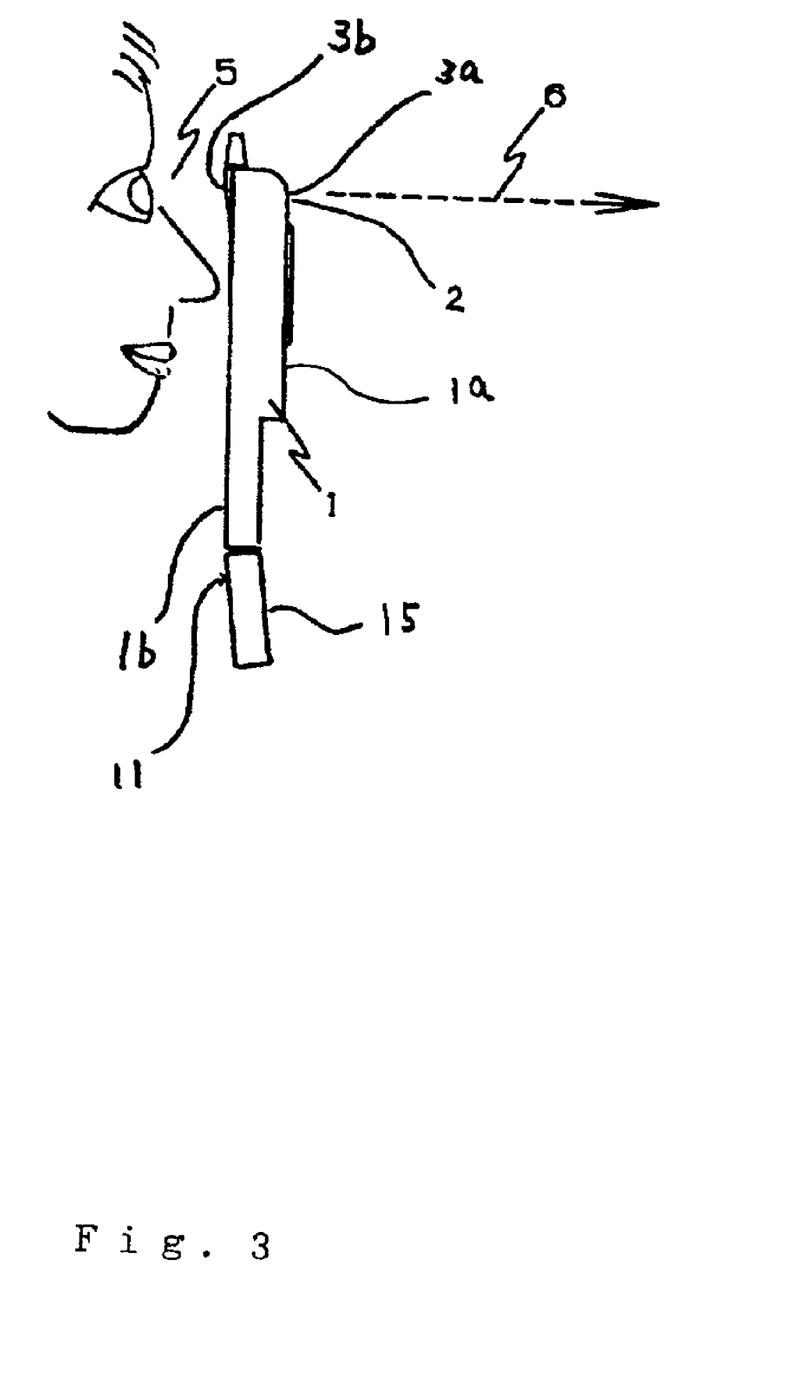
FIG. 3 is an explanatory view to explain how to use the cellular phone equipped with the imaging device of FIG. 1.
Figure 4:
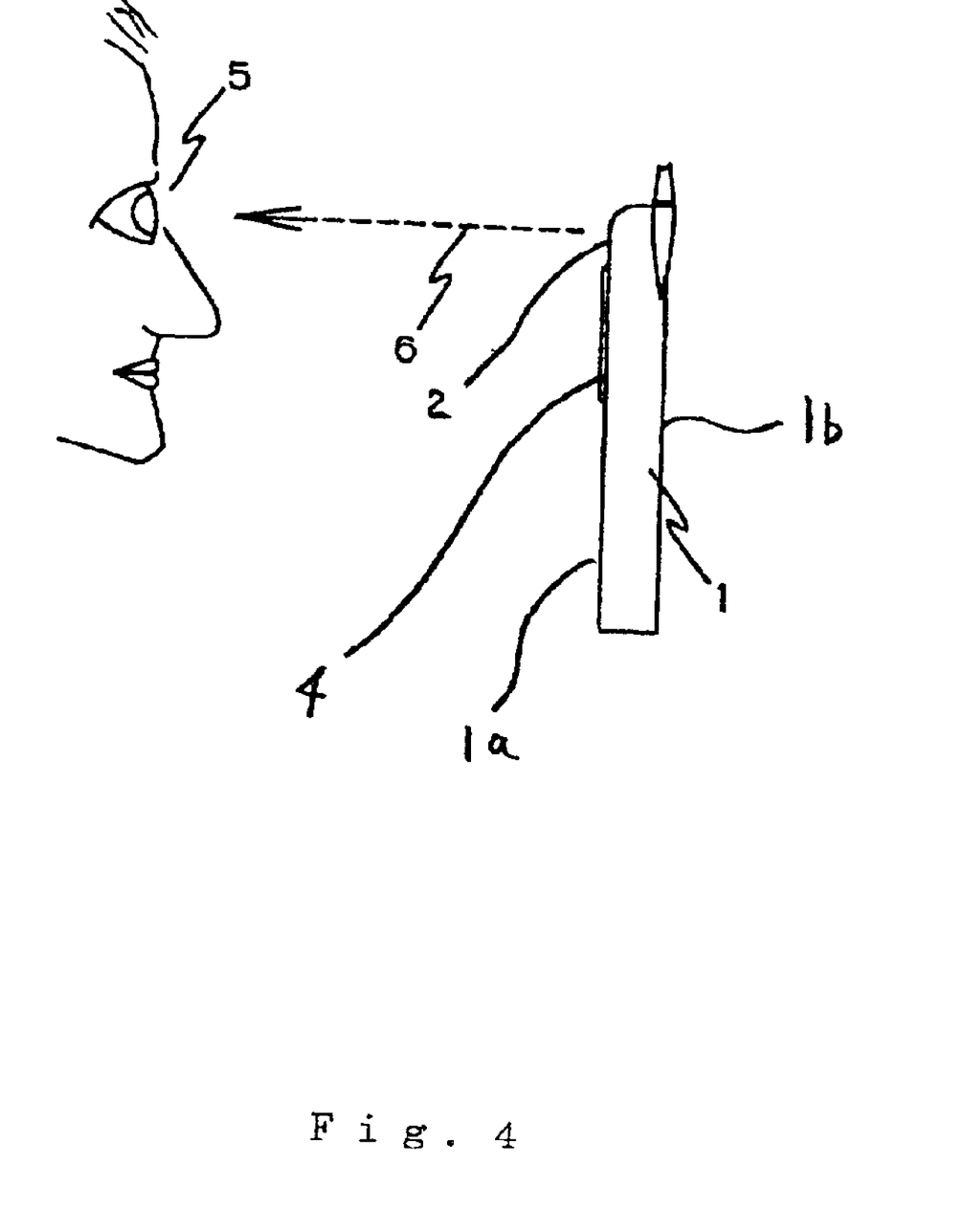
FIG. 4 is an explanatory view to explain how to use the cellular phone equipped with the imaging device of FIG. 1.

Now, operation (directions for use) of the cellular phone 1 in FIGS. 1 and 2 is described with reference to FIGS. 3 and 4. FIG. 3 shows a case of taking a picture of any object (such as landscape) seen from a user 5 by means of the camera 2 of the cellular phone 1. FIG. 4 shows a case of taking a picture of the user 5 himself by means of the camera 2. In the drawings, numeral 5 designates the user of the cellular phone 1. Numeral 6 designates an additional explanatory line indicating a photographing direction of the camera 2.

For taking a picture of the object seen from the user 5 such as landscape, as shown in FIG. 3, the user 5 brings his eye substantially in contact with the eyepiece 3*b* to recognize the object (not shown) in the viewfinder. At this time, by opening the cover 15, the microphone 11 can be caused to face the user side.

Further, in the case of having a conversation with the person at the other end of the line while visually recognizing each other on the monitor 4, as shown in FIG. 4, the user 5 keeps his face away from the cellular phone 1, for example, by a distance of his extended arm's length. In this operation, it is necessary the user 5 to talk while recognizing how his face is being taken on the monitor 4. At this time, it is preferable that both of the faces of the user and the person at the other end of the line can be simultaneously displayed on the display, e.g., by dividing the screen into halves, or by switching so that either one of them can be displayed. Whether or not the photographed image is transmitted to outside by communication means of this cellular phone is a free choice of the user. In the case of not being transmitted, the camera is used only as the so-called digital camera. In this sense, it is not always required that the cellular phone has a function of transmitting the image.

Embodiment 2

Figures 5A, 5B:
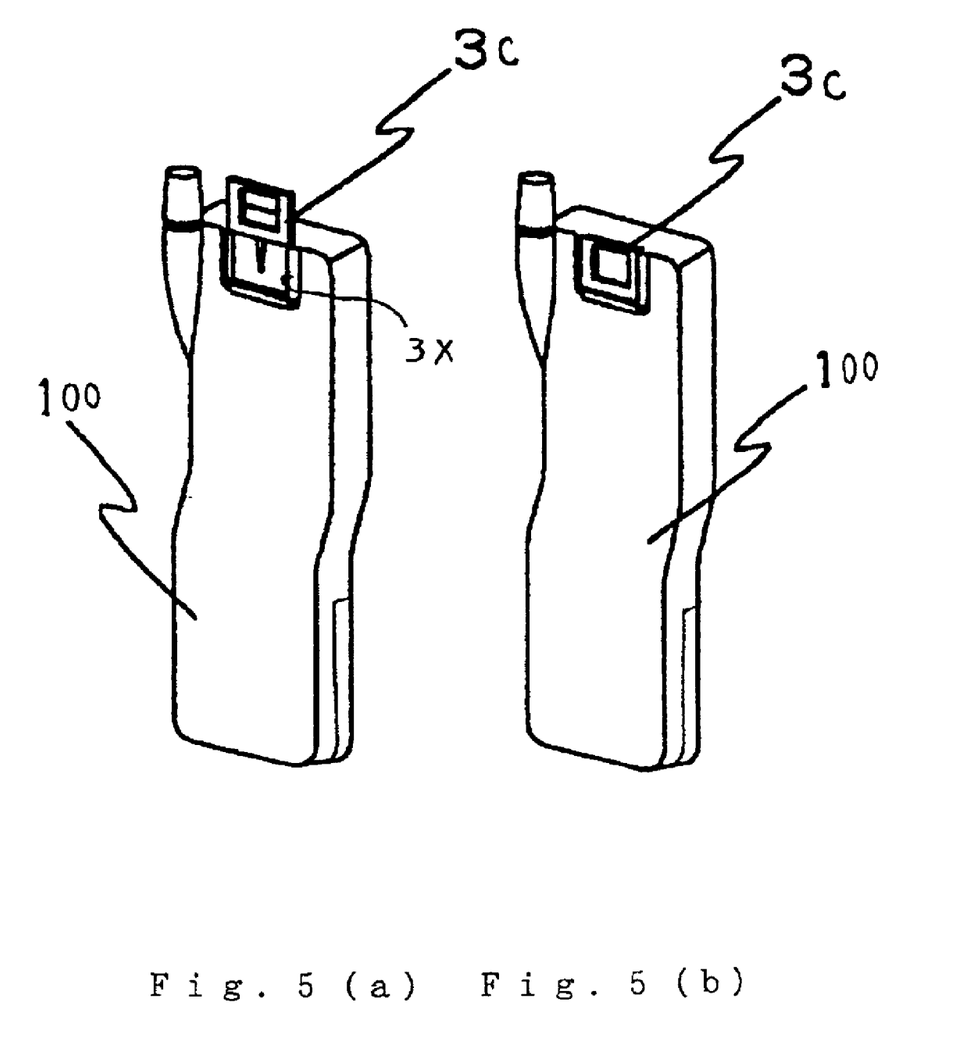

In the constructions of the cellular phone 1 shown in FIGS. 1 to 4 according to the foregoing Embodiment 1, it is preferable that the viewfinder 3 is formed into a collapsible type finder, which is now described in detail with reference to FIGS. 5(*a*) and (*b*). FIG. 5 (*a*) shows a state of a collapsible viewfinder 3*c* being opened, while FIG. 5(*b*) shows a state of the collapsible viewfinder 3*c* being stored (collapsed). The collapsible viewfinder 3*c* can be simply arranged just by providing a hole through a plate (a viewfinder-mounting member). Numeral 3*x* designates a recess formed in the housing 100 of the cellular phone 1 for storing the collapsible viewfinder 3*c*.

In the construction of FIG. 1 showing Embodiment 1, the viewfinder 3 is located by providing the light passage aperture through the housing 100 of the cellular phone 1. In such a construction, from the viewpoint of maintaining strength of the housing 100 of the cellular phone 1, it is difficult to secure a large space for the viewfinder. Moreover, in such a construction, a problem exists in that it is difficult to form the viewfinder 3 at the very end of the housing.

On the other hand, in the construction of FIGS. 5(*a*) and (*b*), the viewfinder 3*c* is stored in the recess 3X as shown in FIG. 5(*b*). At the time of use, as shown in FIG. 5(*a*), the plate of the viewfinder 3*c* is pulled out and fastened, and the eye is put close thereto. Then, the object is brought within the visual field to be photographed.

The viewfinder 3*c* is sufficiently smaller in thickness than that of the housing 100 of the cellular phone, thereby the recess 3*x* being very small in depth. Therefore, even if the recess 3*x* is formed in the housing 100 of the cellular phone, a storage volume is not reduced in the internal part. Also, it is possible that a size of the viewfinder 3 is made larger up to a width of the housing of the cellular phone.

Although the viewfinder 3*c* is mounted on the side of the rear side 1*b* of the housing 100 of the cellular phone in FIGS. 5(*a*) and (*b*), it is also preferable that the viewfinder 3*c* is mounted on the front side 1*a*. In such an arrangement, the recess 3*x* is provided on the front side as a matter of course. Further, it is also preferable that the recess 3*x* is provided in the form of a hole provided in the internal part of the housing, so that the viewfinder 3*c* may be drawn from the hole.

Embodiment 3

Figure 6A:
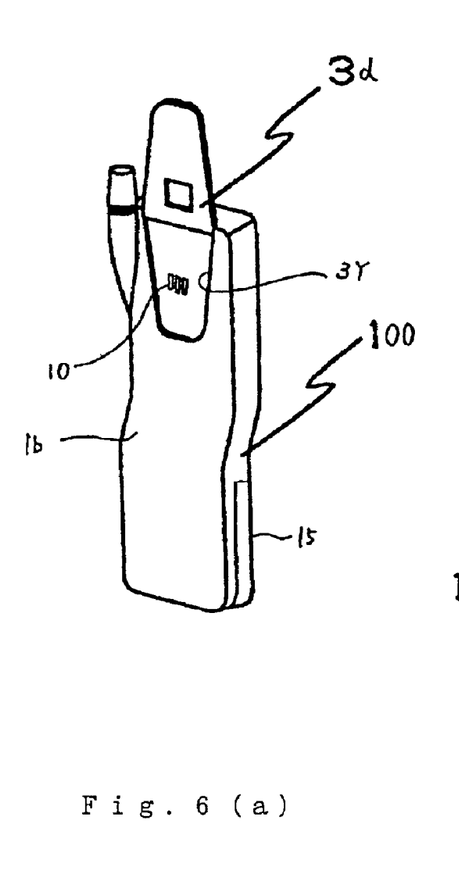
FIGS. 6(a) and (b) are external perspective views of the cellular phone equipped with the imaging device according to Embodiment 3.
Figure 6B:
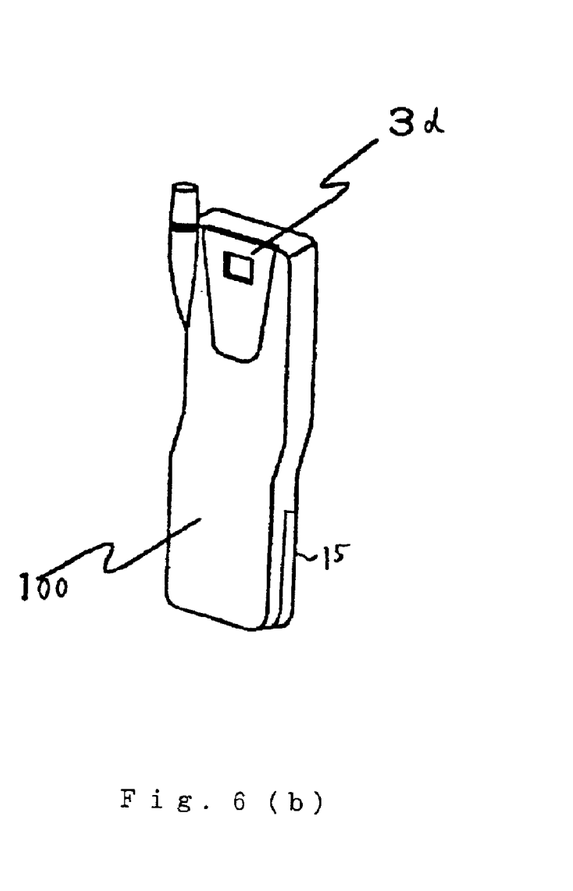

It is also preferable that the viewfinder 3 is formed into an opening-and-closing type finder, which is now described in detail with reference to FIGS. 6(*a*) and (*b*). FIG. 6(*a*) shows a state of the opening-and-closing type viewfinder 3*d* being opened. FIG. 6(*b*) shows a state of the collapsible viewfinder 3*d* being closed. arranged by providing a hole through a plate (a viewfinder-mounting member). Numeral 3*y* designates a recess for storing the opening-and-closing type viewfinder 3*d*.

In the construction of FIG. 1 showing Embodiment 1, the speaker 10 is mounted on the front side 1*a* of the cellular phone. Therefore, when the user 5 puts his face close to the rear side 1*b* of the housing 100 of the cellular phone as shown in FIG. 3 according to the first embodiment in order to take a picture of, e.g., a landscape, the speaker comes to face outwardly. As a result, there is a possibility that words of the person at the other end of the line are not always distinguished clearly.

Accordingly, in this embodiment of FIG. 6, the speaker 10 is not only provided on the front side but also in the recess 3*y* on the rear side 1*b*. It is preferable that two speakers 10 may be mounted respectively for the front side and for the rear side. It is also preferable that only one speaker is provided, but holes for outputting the sound (openings called in this invention) are opened through both front and rear sides.

When closing the viewfinder 3*d*, a portion of the plate of the viewfinder 3*d*, which portion is not provided with any hole, shuts the speaker 10 on the rear side (or opening). Therefore, when using the cellular phone by bringing the side of the front side 1a of the cellular phone 1 into close contact with the ear, any unnecessary sound is prevented from leaking to outside. It is a matter of course that the viewfinder 3d is fastened by any fastener not shown when opened. Furthermore, the viewfinder 3d is securely fastened by a protrusion not shown, which is provided in the recess 3y, also when closed. In FIG. 6, the plate of the viewfinder 3d is illustrated being opened and closed in the form of a hinge. However, it is also preferable that the plate may be turned along the rear side 1b and then extended. Furthermore, in the same manner as in FIG. 5 showing Embodiment 2, it is preferable that the recess 3y may be a hole. In such a construction, the plate of the viewfinder 3d is slid from the hole to be drawn.

Embodiment 4

Figure 7:
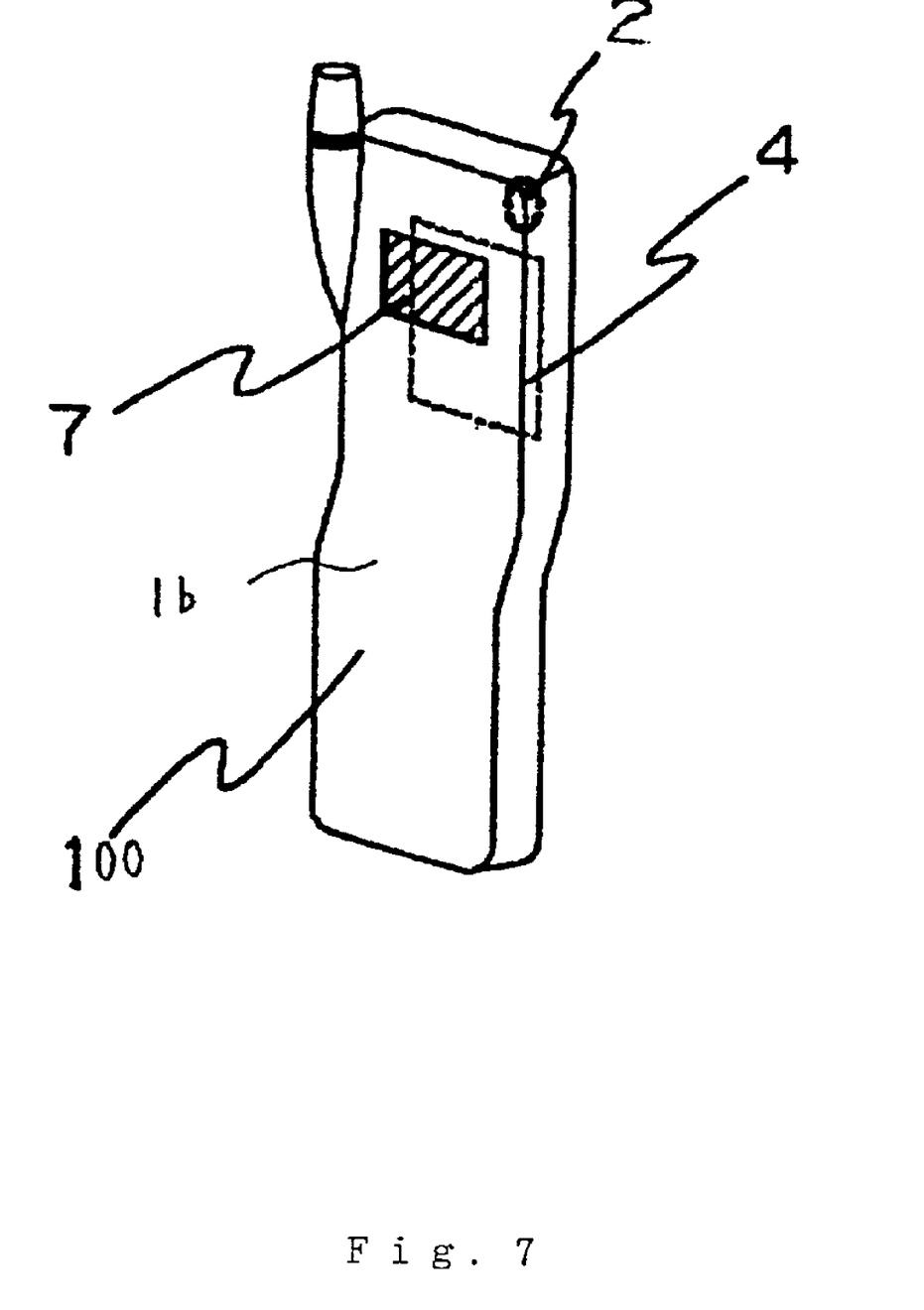
FIG. 7 is an external perspective view of the cellular phone equipped with the imaging device according to Embodiment 4.

FIG. 7 shows a perspective view of an essential part of the cellular phone according to Embodiment 4 of the invention. In the drawing, numeral 7 designates a back monitor provided on the rear side 1b of the housing 100 of the cellular phone. The back monitor 7 is used exclusively for displaying the image photographed by the camera 2, and furthermore the back monitor 7 can display various information of the telephone as a matter of course. The user adjusts the direction of the cellular phone while watching the image displayed on the back monitor 7.

For example, it may be required to switch between the use shown in FIG. 3 according to Embodiment 1 (taking a picture of the forward side seen from the user) and the use shown in FIG. 4 (taking a picture of the user himself) for each word of the telephone call. In this case, it is quite troublesome to repeat the motion of stretching the arm (in the case of FIG. 4) and bending the arm to bring the face in contact with the eyepiece 3b of the cellular phone 1. To cope with this, in the arrangement of FIG. 7, the back monitor 7 may carry out the visual recognition at the time of taking a picture of the forward side. And the monitor 4 on the front side 1a may carry out the recognition at the time of taking a picture of the user himself. Thus, in the case of FIG. 7, only the change in direction of the camera 2 is required with the arm being extended at all times, thereby the cellular phone being easily used.

A switch for the purpose of using the back monitor 7 or stopping the use thereof is to be provided on any side other than the front side 1a. Thus, the user can select the use of the back monitor or the disuse thereof depending on the situation.

Embodiment 5

The cellular phone 1 has been more light and smaller due to recent remarkable progress in technology. Further, in order to fit better the hand, the cellular phone 1 has been configured with complicated curve. Consequently, at the time of taking a photograph by the camera 2 mounted on the cellular phone, it becomes difficult to cause the cellular phone 1 to stand upright in posture with respect to the ground. Supposing that the camera without standing upright in posture might carry out the photography, the image will be tilted and distorted on the monitor screen as a matter of course. It is not desirable that any image difficult to be seen due to distortion is transmitted to the person at the other end of the line.

Figure 8:
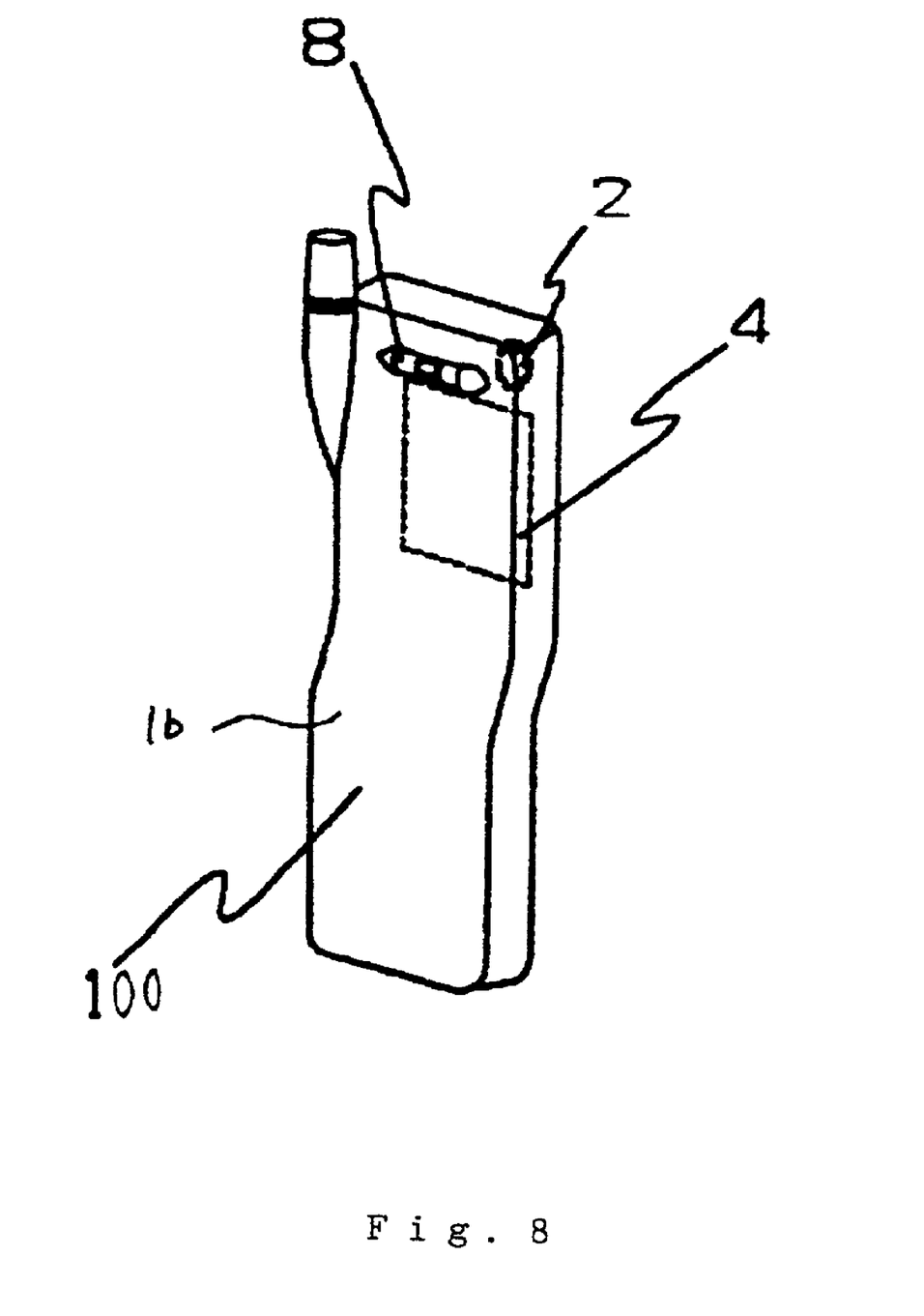
FIG. 8 is an external perspective view of the cellular phone equipped with the imaging device according to Embodiment 5.

FIG. 8 shows an external perspective view of a cellular phone in which such problem has been solved. In the drawing, numeral 8 designates a tiltmeter for displaying a tilt of the cellular phone 1 relative to the ground. In FIG. 8, although the tiltmeter 8 is disposed only on the rear side 1b of the cellular phone 1, it is also preferable that the tiltmeter 8 is disposed, e.g., on top face, side face and the front side 1a. Further, it is also preferable that the tiltmeter is disposed in the viewfinder 3 shown in FIGS. 1, 2 according to Embodiment 1, and utilized to ensure that the cellular phone is standing upright while watching through the viewfinder.

Figure 9:
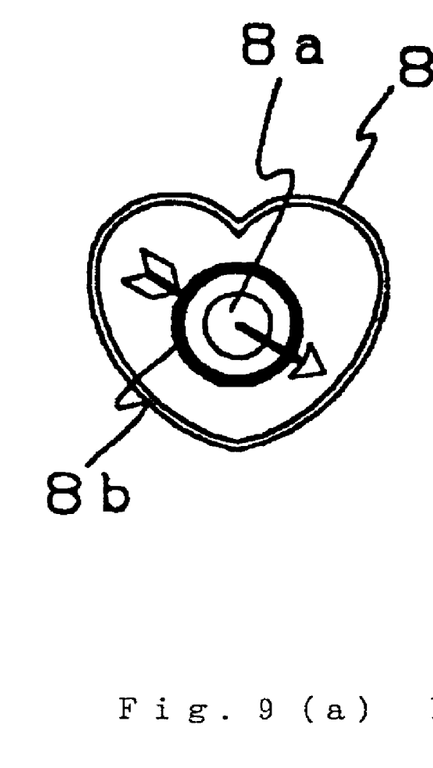

Examples of specific configuration of the tiltmeter 8 are shown in FIGS. 9(a) and (b). In the drawings, numeral 8a designates a bubble indicating a degree of the tilt as a position. Numeral 8b designates a light emitting diode for lighting (hereinafter indicator light).

The tiltmeter 8 in FIG. 9(a) is to indicate the tilt in horizontal plane two-dimensionally, and is formed into a lovely heart.

The tiltmeter 8 in FIG. 9(b) carries out the two-dimensional indication in the same manner as that in FIG. 9(a). However, a degree of the tilt can be indicated separately in each dimension resulting in a more functional design.

In addition, supposing that the indication light 8b in FIG. 9(a) or (b) is set to be lighted, for example, when the cellular phone has received any incoming call, the indicator light 8b can also be used as the indication for receiving the incoming call. Note that the light may be either of the continuous lighting or the flickering. It is also preferable that the light may be out upon starting the conversation.

What is claimed is:

1. A cellular phone equipped with an imaging device, comprising:

a housing which accommodates a transceiver capable of transmitting and receiving an audio signal, and includes a first face and a second face facing in a substantially opposite direction to said first, face;

an imaging device which includes a lens disposed facing outwardly on said first face and an image device for converting a light from said lens into an image signal;

a monitor which is disposed on said first face and capable of displaying an image; and a viewfinder defining a light passage aperture leading from said second face to said first face, wherein said viewfinder is provided on a viewfinder mounting member which is accommodated in a recess provided in said housing, pulled out from said recess when it is used, and fastened to the outside of said housing, and wherein said recess is formed on the first face or the second face of said housing;

the cellular phone equipped with the imaging device further comprising:

a speaker which is mounted on an internal part of said housing, and outputs said audio signal; and an opening which is formed within said recess, outputs a sound of said speaker, and covered with said viewfinder mounting member accommodated in said recess.

2. A cellular phone equipped with an imaging device, comprising:

a housing which accommodates a transceiver capable of transmitting and receiving an audio signal, and includes a first face and a second face facing in a substantially opposite direction to said first face;

an imagine device which includes a lens disposed facing outwardly on said first face and an image device for converting a light from said lens into an image signal;

a monitor which is disposed on said first face and capable of displaying an image; and a viewfinder defining a light passage aperture leading from said second face to said first face, wherein a tiltmeter showing a degree of tilt of said housing is provided on the surface of said housing, and wherein said tiltmeter is provided with an indicator light that is illuminated when a signal has come into said transceiver.

3. A cellular phone equipped with an imaging device, comprising:

a housing which accommodates a transceiver capable of transmitting and receiving an audio signal, and includes a first face and a second face facing in a substantially opposite direction to said first face;

an imaging device which includes a lens disposed facing outwardly on said first face and an image device for converting a light from said lens into an image signal;

a monitor which is disposed on said first face and capable of displaying an image; and a rear side monitor which is disposed on said second face and capable of displaying an image based on said image signal, wherein a tiltmeter showing a degree of tilt of said housing is provided on the surface of said housing, and wherein said tiltmeter is provided with an indicator light that is illuminated when a signal has come into said transceiver.

* * * * *